April 27, 1943.　　　　C. F. KRAMER　　　　2,317,620
SEAT
Filed June 7, 1941

Clarence F. Kramer
INVENTOR.

E. C. McRae and
Robert J. Harris
ATTORNEYS.

WITNESS
William Tilly

Patented Apr. 27, 1943

2,317,620

UNITED STATES PATENT OFFICE 2,317,620

SEAT

Clarence F. Kramer, Birmingham, Mich., assignor to Ford Motor Company, Dearborn, Mich., a corporation of Delaware Application June 7, 1941, Serial No. 396,972

3 Claims. (Cl. 155—12)

This invention concerns motor vehicles and more particularly a seat structure to be used on such vehicles.

An object of this invention is to provide a seat construction such that the seat may be readily folded to occupy a minimum of space when not actually in use. A further object of this invention is to provide a folding seat in which both the back and seat portions thereof are moved from the positions they occupy when in use to other positions when the seat is folded up.

As an example of this invention, I show it in use on a reconnaissance car, which is a type of vehicle used in military service. This car is extremely light, is equipped with four-wheel drive, and is designed to be operated over rough terrain. As combat units, these cars are subjected to extreme and arduous service and must be expected to operate at the highest possible speed. A further consideration, which is of importance in military use, is that the lowest possible silhouette be maintained in these vehicles so that they may be disguised effectively. Consequently, the height of the vehicle is kept to a practicable minimum and the windshield thereof is made so that it may be folded down and, in addition, any other vertical projection must be such that it may be reduced to a minimum when the circumstances demand.

A further requirement of this type of vehicle is that it may be used either for the transport of soldiers, in which case all available seating capacity must be provided, or as a mount for light guns or the transport of supplies, in which case it is desirable to have such seating capacity quickly removable and disposed out of the way. Another consideration which is important is that as these vehicles are frequently used for the transport of objects that are larger than the tonneau thereof, it is desirable that nothing projects above such tonneau to interfere with the carrying of these larger objects.

To accomplish these requirements, a folding seat is called for which must be of durable and sturdy construction. Moreover, it must fold into an absolute minimum of space, leaving the interior of the car as unimpeded as possible. To maintain a low silhouette and prevent interference with the carrying of large articles referred to above, it must be so mounted that when it is folded down no part thereof projects above the tonneau of the vehicle. Comfort requires that the back of the seat, when open, slopes from the vertical; but to conserve space when folded, the back should then be positioned as nearly vertical as practicable.

With these and other objects in view, my invention consists in the arrangement, construction and combination of the various parts of my improved device, described in the specification, claimed in my claims, and illustrated in the accompanying drawing in which:

Figure 1:
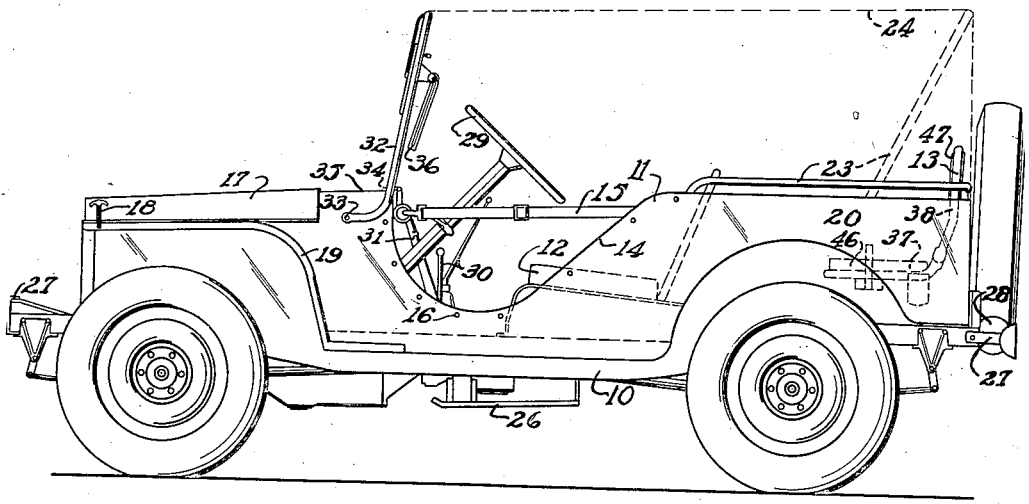
Figure 1 represents a side elevation of a motor vehicle.
Figure 4:
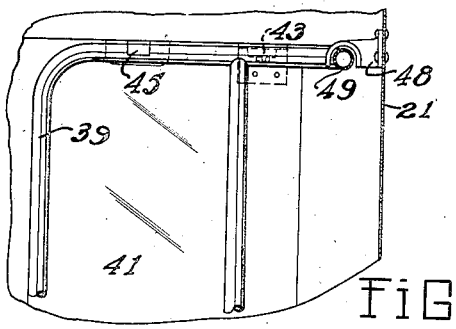
Figure 4 is a sectional view, on an enlarged scale, on the line 4—4 of Figure 2.

Referring now to Figure 1, a motor vehicle of the type known as a reconnaissance car is shown which has a frame 10 and a body 11. The body is equipped with a front seat 12 and a rear seat 13 and, instead of the customary doors, has a cutaway portion 14 and the detachable safety straps 15. Snap fasteners 16 are placed about the opening 14 and a protective curtain may be fastened therein.

The hood portion 17 of this vehicle, which is hinged at its rear edge to the body, is broad and flat and is held down at the front by latches 18. Fenders 19 are provided for the front wheels, the rear wheels being under the body of the vehicle, thereby increasing the available passenger-carrying width thereof. The tonneau proper has the side panels 20 and the rear panel 21, the rear seat 13, which forms a part of this invention, being disposed therein.

The tonneau is surrounded by a handrail 23, which may be detached therefrom and erected as shown in dotted line to form a support for a top covering 24. A skid 26 is provided which protects the running gear of the vehicle and bumpers 27 are carried at the front and back thereof, the rear bumper being made in two parts to permit the mounting of a tractor hook 28.

The usual steering wheel 29 is provided, as are the transmission and transfer case levers 30, the latter being used for the selective operation of the front wheel drive. A hand-brake lever 31 completes the control.

As noted above, the windshield may be folded down; and this includes a windshield frame 32, which is pivoted to the body at 33 and which has a lower crossbar 34 resting on the cowling 35. The windshield proper is mounted within this frame and may be pivotally or otherwise secured thereto, in this case a regulator 36 being provided.

Figure 2:
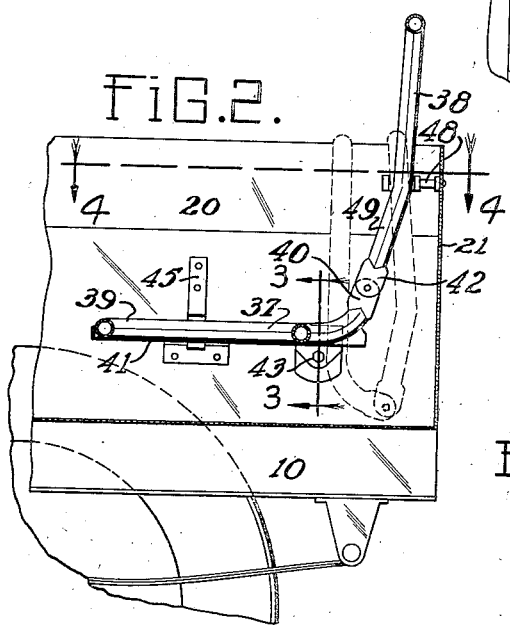
Figure 2 is a partial sectional view taken substantially on the longitudinal center line thereof.

Attention is now directed to the construction of the rear seat. This is shown in full line in Figure 2 and partially in dotted line in Figure 1 in its usual open position. It is also shown in dotted line in Figure 2 in the position it assumes when folded up. In the latter position, it will be noted that it occupies a minimum of space and that, moreover, the back thereof, which formerly projected a considerable distance above the top of the tonneau, is now securely protected within it. For clarity in reference, the two major parts of the assembly will be referred to as seat 37 and back 38.

Figure 3:
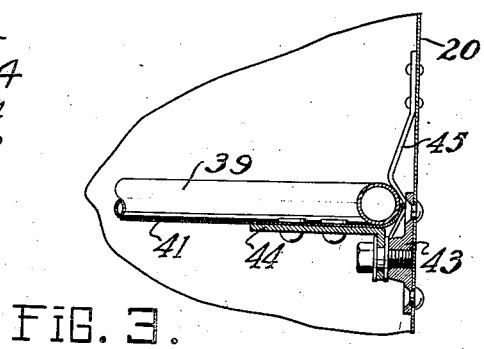
Figure 3 is a sectional view, on an enlarged scale, taken on the line 3—3 of Figure 2.

The seat includes the seat frame 39, which is made of tubing and which has upwardly and rearwardly extending ears 40. This frame is further reinforced, as best shown in Figure 3, by the seat plate 41, which is secured thereto. The back 38 is also constructed from tubing suitably bent and at its lower end has the ears 42.

A pivot post 43 is secured in the interior of each of the side panels 20 and an angle 44 is pivotally secured therein, having its other leg secured to the plate 41. It is apparent that the seat frame 39 is free to pivot above the pivot point indicated. Holes are provided in the ears of the seat and back frames and these two frames are pivotally connected together at each of these points. A spring catch 45 is mounted on the side member 20 so that when the seat is in its open position, it will be engaged thereby and will be held in that position until the spring pressure is overcome. In ordinary use, a cushion 46 is carried by the plate to form a rear seat, while a similar cushion 47 is secured between frame members which comprise the back support.

U-shaped guides 48 are secured to each side of the rear panel 21 and are adapted to slidably receive the side bars 49 of the back. These serve as braces for the back in their open position and as guides for it in other positions.

It will be noted that by having the main pivot point mounted somewhat forwardly of the back line of the seat and having the back pivoted to the seat above and behind the main pivot point, when the seat is folded down the back thereof is automatically brought down and pushed backwardly, thereby taking up a minimum amount of space. It will be noted that this operation is entirely automatic and the mere operation of the seat is all that is required to fold down the back as well. In other folding seats that have come to the applicant's attention, either only the seat portion itself folds out of the way, or when movement of both the seat and the back portion is permitted, the latter must be done separately. In the present instance such operations must be done speedily and surely and it is in this respect that this construction is particularly valuable.

Some changes may be made in the arrangement, construction and combination of the various parts of my improved construction without departing from the spirit of my invention and it is my intention to cover by my claims such changes as may reasonably be included within the scope thereof.

I claim:

1. In a motor vehicle, in combination, a body structure having spaced side walls and a rear wall, a folding seat structure disposed between said spaced side walls, comprising, a seat frame, a pivot on each side of said seat frame and engaging pivots on said adjacent side walls, said seat frame having oblique extensions extending rearwardly and upwardly, a back frame having side members extending downwardly and pivoted at their lower ends to the extensions on said seat frame, channel-shaped guide means carried on said body structure adjacent said side walls, the side members of said back frame being slidably receded in said channel-shaped members and constrained thereby for movement in a substantially vertical plane.

2. The structure of claim 1, which is further characterized in that resilient locking means is provided to maintain said seat structure in open position.

3. The structure of claim 1, which is further characterized in that resilient locking means secured to said side wall engages said seat frame to maintain said seat frame in open position, the center of gravity of the components of said seat being displaced with respect to the pivot points on said side wall when said components are in the closed position to make said seat structure substantially self-locking in said closed position.

CLARENCE F. KRAMER.